(12) United States Patent
Park et al.

(10) Patent No.: US 7,579,979 B1
(45) Date of Patent: Aug. 25, 2009

(54) BOMB IMPACT ASSESSMENT USING FORWARD LOOKING INFRARED SENSOR

(75) Inventors: Jennifer K. Park, Winter Springs, FL (US); Gene D. Tener, Oviedo, FL (US); William H. Barrow, Clermont, FL (US); Gary E. Wiese, Orlando, FL (US)

(73) Assignee: Lockheed Martin Corporation, Bethesda, MD (US)

( * ) Notice: Subject to any disclaimer, the term of this patent is extended or adjusted under 35 U.S.C. 154(b) by 1850 days.

(21) Appl. No.: 10/648,989

(22) Filed: Aug. 26, 2003

(51) Int. Cl.
*B64D 1/04* (2006.01)
(52) U.S. Cl. ........................................ 342/53
(58) Field of Classification Search .................. 89/1.11; 102/293; 342/53
See application file for complete search history.

(56) References Cited

U.S. PATENT DOCUMENTS 6,772,086 B2 * 8/2004 Van Wagoner, III ......... 702/150

* cited by examiner

*Primary Examiner*—Ian J Lobo
(74) *Attorney, Agent, or Firm*—Jeffrey D. Myers; Peacock Myers, P.C.; Timothy D. Stanley

(57) ABSTRACT

An apparatus combining an optical sensor and a bomb impact assessment system, and corresponding method for facilitating bomb impact assessment, comprising means for receiving an optical signal, means for splitting off a portion of the optical signal from a primary optical path to form a secondary optical path, a lens in the secondary optical path, the lens comprising a plurality of facets generating a plurality of tertiary optical paths, means for combining signals from the primary and one or more of the tertiary optical paths, means for detecting the combined signals, and means for projecting onto a focal plane array bomb impact assessment data comprising detected signals from one or more of the tertiary optical paths.

20 Claims, 1 Drawing Sheet

BOMB IMPACT ASSESSMENT USING FORWARD LOOKING INFRARED SENSOR

STATEMENT REGARDING FEDERALLY SPONSORED RESEARCH OR DEVELOPMENT

The U.S. Government has a paid-up license in this invention and the right in limited circumstances to require the patent owner to license others on reasonable terms as provided for by the terms of Contract No. F33657-99-C-0049 awarded by the U.S. Air Force.

CROSS-REFERENCE TO RELATED APPLICATIONS

Not Applicable.

INCORPORATION BY REFERENCE OF MATERIAL SUBMITTED ON A COMPACT DISC

Not Applicable.

COPYRIGHTED MATERIAL

Not Applicable.

BACKGROUND OF THE INVENTION

1. Field of the Invention (Technical Field)

The present invention relates to methods and apparatuses for performing bomb impact assessment (BIA) in conjunction with Forward Looking Infrared Radar (FLIR) systems.

2. Description of Related Art

FLIR systems, especially for fixed-wing aircraft, have Incorporated BIA capabilities. However, previous BIA capabilities have typically been provided via two separate BIA radiometers, which occupy needed space on the FLIR optical bed.

The present method and apparatus for incorporating BIA into FLIR systems does not necessitate the removal of other pod capabilities in order to make space for the separate BIA radiometers. It maximizes the capability of the focal plane array (FPA), with a minimum of additional hardware (e.g., optics, fibers, connectors).

BRIEF SUMMARY OF THE INVENTION

The present invention is of an apparatus combining an optical sensor and a bomb impact assessment system, comprising: means for receiving an optical signal; means for splitting off a portion of the optical signal from a primary optical path to form a secondary optical path; a lens in the secondary optical path, the lens comprising a plurality of facets generating a plurality of tertiary optical paths; means for combining signals from the primary and one or more of the tertiary optical paths; means for detecting the combined signals; and means for projecting onto a focal plane array bomb impact assessment data comprising detected signals from one or more of the tertiary optical paths. In the preferred embodiment, the apparatus comprises a forward looking infrared radar. The lens preferably comprises four to eight facets. The splitting off means preferably comprises means for splitting off a plurality of wavebands, more preferably midwave infrared wavebands, and most preferably wherein two of the wavebands fall within approximately 3.5-4.0 µm and 4.5-4.9 µm. Two or more lens facets are preferably allocated to a single waveband, more preferably wherein at least two of the two or more lens facets have different aperture sizes, and most preferably in conjunction with means for sampling detected signals from the tertiary optical paths corresponding to the two or more lens facets, thereby permitting saturation analysis of the tertiary optical paths. Preferably, the receiving means comprises a beamsplitter, the splitting off means comprises an optical pick-off mechanism, the lens comprises a collimating and focusing lens, the combining means comprises an optical reinsertion mechanism, the detecting means comprises an integrated detector cooler assembly, and the projecting means operates at a plurality of sampling rates.

The present invention is also of a method facilitating bomb impact assessment, comprising: receiving an optical signal; splitting off a portion of the optical signal from a primary optical path to form a secondary optical path; employing a lens in the secondary optical path, the lens comprising a plurality of facets generating a plurality of tertiary optical paths; combining signals from the primary and one or more of the tertiary optical paths; detecting the combined signals; and projecting onto a focal plane array bomb impact assessment data comprising detected signals from one or more of the tertiary optical paths. In the preferred embodiment, the method is accomplished in conjunction with a forward looking infrared radar. The lens preferably comprises four to eight facets. Splitting off comprises splitting off a plurality of wavebands, preferably midwave infrared wavebands, and most preferably wherein two of the wavebands fall within approximately 3.5-4.0 µm and 4.5-4.9 µm. Two or more lens facets are preferably allocated to a single waveband, more preferably wherein at least two of the two or more lens facets have different aperture sizes, and most preferably additionally comprising the step of sampling detected signals from the tertiary optical paths corresponding to the two or more lens facets, thereby permitting saturation analysis of the tertiary optical paths. Preferably, receiving comprises employing a beamsplitter, splitting off comprises employing an optical pick-off mechanism, the lens comprises a collimating and focusing lens, combining comprises employing an optical re-insertion mechanism, detecting comprises employing an integrated detector cooler assembly, and the projecting step operates at a plurality of sampling rates.

Objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the Invention. The objects and advantages of the invention may be realized and attained by means of the instrumentalities and combinations particularly pointed out in the appended claims.

BRIEF DESCRIPTION OF THE SEVERAL VIEWS OF THE DRAWINGS

The accompanying drawings, which are incorporated into and form a part of the specification, illustrate one or more embodiments of the present invention and, together with the description, serve to explain the principles of the invention. The drawings are only for the purpose of illustrating one or more preferred embodiments of the invention and are not to be construed as limiting the invention. In the drawings.

DETAILED DESCRIPTION OF THE INVENTION

The present invention modifies existing FLIR targeting sensors to provide Bomb Impact Assessment (BIA) capability to measure and record radiographic data associated with detonation of weapons, such as tritonal filled penetrating weapons. The radiographic data is used to assist post-mission determination of weapon events.

The invention overcomes a lack of available space needed on a targeting pod optical bed to add a BIA sensor. The invention utilizes existing performance capabilities of the focal plane array (FPA) combined with a minimum of additional hardware to enable a FLIR to collect BIA weapon event data for post-mission assessment and intelligence purposes.

The invention uses a small lens to collect a portion of the transmitted mid-wave infrared (MWIR) optical energy from the second narrow field of view (NFOV) lens in the FLIR optical path. This energy is coupled into a fiber optic, propagates along the fiber optic length, and is re-inserted in an intermediate focal plane for projection onto the FPA.

Dynamic range analysis verifies that several fibers are preferred (most preferably four to eight) to exploit the FLIR's signal-to-noise collection capabilities without detector saturation. The small collection lens is preferably multi-faceted to focus the MWIR energy into separate fibers so that lower signal intensity levels will be collected with less attenuation to maintain signal-to-noise requirements, while high signal intensities are damped to avoid detector saturation. The multi-faceted lens also preferably has bandpass coatings to separate and collect the two bands of MWIR optical energy needed for BIA analysis.

Figure 3:
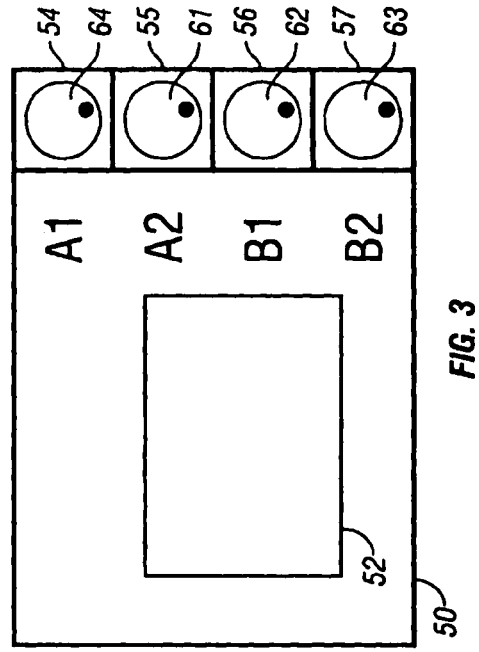
FIG. 3 is a schematic diagram of the preferred focal plane array (FPA) division making use of the invention.

BIA data sampling analysis indicates that a 240 Hz sampling rate is sufficiently fast to collect the intensity spikes that can occur during weapons detonations. The normal FLIR frame rate is 60 Hz, so to achieve the faster frame rate the FPA is preferably windowed 52 to a smaller size (e.g., 368×232 pixels accounting for, for example, a 0.42 degree field of view (FOV)) than the standard 640×512 pixels frame 50 (see FIG. 3). The transition from the 60 Hz window to the 240 Hz window takes approximately 90 ms. This window preferably appears only on the FPA and will not affect the displayed image presented to the pilot. The area for BIA data (while not displayed to the pilot) is preferably further partitioned into smaller square areas 54,55,56,57 (e.g., 40 pixel diameter) that are still large enough to provide margin for Line Of Sight (LOS) alignment tolerances. Within each smaller square, for example, is an eight pixel diameter spot 60,61,62,63 of BIA data, which can be digitally sampled and discriminated through algorithms to determine which data set within each waveband will be used. For example, if the BIA data from Fiber A1 saturates at a given intensity, the next fiber in that waveband, Fiber A2, would be used for data collection The invention exploits the midwave infrared (MWIR) sensing capability of existing FPAs by combining it with a minimal amount of additional hardware (lenses and fiber optics) to collect BIA data. Critical bomb impact information can be obtained by analyzing bomb plume signatures to determine whether the weapon detonated "in-facility," "in-soil," or did not detonate at all. The wavebands of interest for BIA collection are, for example, the 3.54.0 μm and 4.5-4.9 μm portions of the MWIR spectrum, which fall nicely within the spectral sensitivity of existing FPAs.

Early BIA data collection capability, such as on the Lantirn targeting pod, was provided via additional BIA dual waveband sensors. Other optical beds lack available space for additional sensors, so the present invention provides a method and apparatus to achieve Lantirn-type performance on other and smaller existing optical beds.

Figure 1:
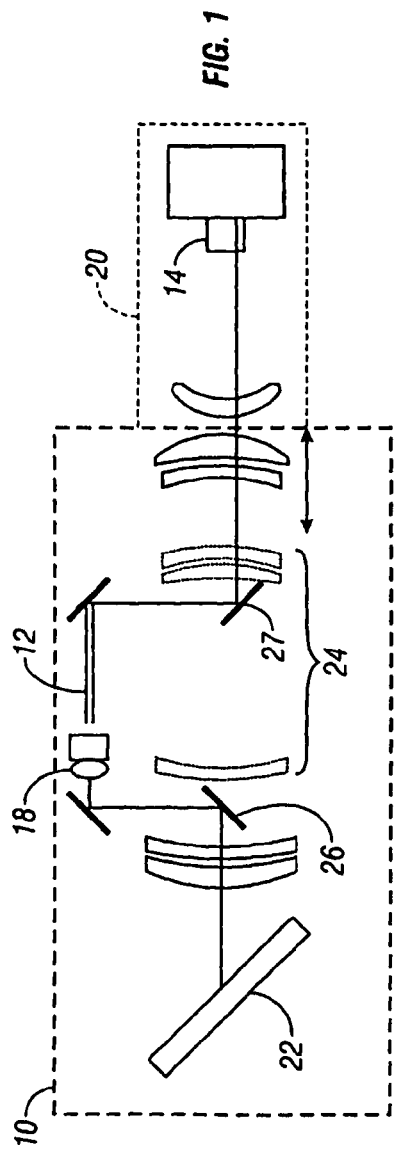
FIG. 1 is a diagram of a FLIR optics LRU (Line Replaceable Unit) modified according to the present invention and the adjacent detector LRU.
Figure 2:
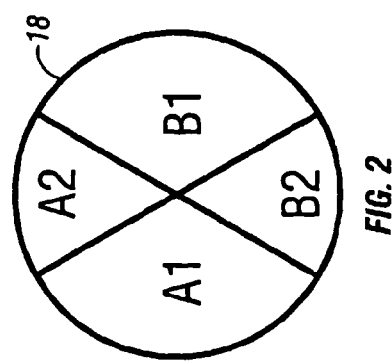
FIG. 2 is a front view of the added multifaceted lens according to the invention.

Referring to FIG. 1, the known FLIR Optics LRU 10, with beamsplitter 22 and wide field of view (WFOV) mechanism 24 is modified to include a fiber optic bundle 12 to direct a small portion of optical energy to a BIA partition on the edge of FLIR FPA 14 within Detector LRU 20 (preferably an Integrated Detector Cooler Assembly (IDCA)). The partitioned FPA simultaneously collects FLIR target imagery and BIA data. A small percentage (preferably approximately 0.4-2.0%) of the transmitted MWIR is collected via the small lens 18 for BIA data collection. In the preferred embodiment, the BIA energy is coupled in four fiber optics using a four-facet lens 18 (see FIG. 2) for four BIA paths. Data for one or more BIA wavebands (preferably 3.54.0 μm and 4.5-4.9 μm) are collected through, preferably, two different sized apertures per waveband, which provides additional performance flexibility. Employing different sized apertures permits employment as necessary of saturation (high intensity) data (small aperture data used for analysis) and low Signal-to-Noise Ratio (SNR) (low intensity) data (large aperture data used to maintain maximum sensitivity).

The incorporation of the BIA optics of the invention into the common optical path has a minimal impact on FLIR performance. The BIA functionality of the invention is achieved through the modification of only three existing LRUs and adds only a Solid State Data Recorder LRU. The LRU modifications preferred are as follows: The FLIR Optics LRU, which is preferably interchangeable with the existing LRU, adds the BIA collimating and focusing lens 18, fiber optics cables 12, BIA optical pick-off and re-insertion mechanisms 26,27 (as known in the telecommunications arts), and a motor for the WFOV mechanism (not shown). The Integrated Detector Cooler Assembly (IDCA) LRU has modified Field Programmable Gate Array (FPGA) firmware as understood by one of ordinary skill in the art from the FPA requirements exemplified in FIG. 3. The Mechanism Electronic Control Assembly (ECA) LRU has a modified motor driver circuit corresponding to the modified WFOV motor in the FLIR Optics LRU.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above are hereby incorporated by reference.

What is claimed is:

1. An apparatus combining an optical sensor and a bomb impact assessment system, said apparatus comprising:
   means for receiving an optical signal;
   means for splitting off a portion of the optical signal from a primary optical path to form a secondary optical path;
   a lens in said secondary optical path, said lens comprising a plurality of facets generating a plurality of tertiary optical paths;
   means for combining signals from said primary and one or more of said tertiary optical paths;
   means for detecting said combined signals; and
   means for projecting onto a focal plane array bomb impact assessment data comprising detected signals from one or more of said tertiary optical paths.

2. The apparatus of claim 1 wherein said apparatus comprises a forward looking infrared radar.

3. The apparatus of claim 1 wherein said lens comprises four to eight facets.

4. The apparatus of claim 1 wherein said splitting off means comprises means for splitting off a plurality of wavebands.

5. The apparatus of claim 4 wherein said plurality of wavebands comprise midwave infrared wavebands.

6. The apparatus of claim 5 wherein two of said wavebands fall within approximately 3.5-4.0 µm and 4.5-4.9 µm.

7. The apparatus of claim 1 wherein two or more lens facets are allocated to a single waveband.

8. The apparatus of claim 7 wherein at least two of said two or more lens facets have different aperture sizes.

9. The apparatus of claim 8 additionally comprising means for sampling detected signals from said tertiary optical paths corresponding to said two or more lens facets, thereby permitting saturation analysis of said tertiary optical paths.

10. The apparatus of claim 1 wherein said receiving means comprises a beamsplitter, said splitting off means comprises an optical pick-off mechanism, said lens comprises a collimating and focusing lens, said combining means comprises an optical re-insertion mechanism, said detecting means comprises an integrated detector cooler assembly, and said projecting means operates at a plurality of sampling rates.

11. A method facilitating bomb impact assessment, the method comprising:
  receiving an optical signal;
  splitting off a portion of the optical signal from a primary optical path to form a secondary optical path;
  employing a lens in the secondary optical path, the lens comprising a plurality of facets generating a plurality of tertiary optical paths;
  combining signals from the primary and one or more of the tertiary optical paths;
  detecting the combined signals; and
  projecting onto a focal plane array bomb impact assessment data comprising detected signals from one or more of the tertiary optical paths.

12. The method of claim 11 wherein the method is accomplished in conjunction with a forward looking infrared radar.

13. The method of claim 11 wherein in the employing step the lens comprises four to eight facets.

14. The method of claim 11 wherein splitting off comprises splitting off a plurality of wavebands.

15. The method of claim 14 wherein the plurality of wavebands comprise midwave infrared wavebands.

16. The method of claim 15 wherein two of the wavebands fall within approximately 3.5-4.0 µm and 4.5-4.9 µm.

17. The method of claim 11 wherein in the employing step two or more lens facets are allocated to a single waveband.

18. The method of claim 17 wherein at least two of the two or more lens facets have different aperture sizes.

19. The method of claim 18 additionally comprising the step of sampling detected signals from the tertiary optical paths corresponding to the two or more lens facets, thereby permitting saturation analysis of the tertiary optical paths.

20. The method of claim 11 wherein receiving comprises employing a beamsplitter, splitting off comprises employing an optical pick-off mechanism, the lens comprises a collimating and focusing lens, combining comprises employing an optical re-insertion mechanism, detecting comprises employing an integrated detector cooler assembly, and the projecting step operates at a plurality of sampling rates.

* * * * *